United States Patent [19]

Fay et al.

[11] Patent Number: 4,913,956

[45] Date of Patent: Apr. 3, 1990

[54] MOLDABLE FIBER GLASS MATERIAL

[75] Inventors: Ralph M. Fay, Lakewood; Philip F. Miele, Highlands Ranch, both of Colo.

[73] Assignee: Manville Corporation, Denver, Colo.

[21] Appl. No.: 349,298

[22] Filed: May 9, 1989

Related U.S. Application Data

[63] Continuation-in-part of Ser. No. 123,824, Nov. 23, 1987, abandoned.

[51] Int. Cl.$^4$ ............................................. B32B 15/00
[52] U.S. Cl. ..................................... 428/285; 428/283; 428/284; 428/288; 428/289; 428/297; 428/298; 428/303; 428/402; 428/403
[58] Field of Search ............... 428/283, 402, 288, 289, 428/285, 297, 298, 303, 903

[56] References Cited

U.S. PATENT DOCUMENTS

| | | | |
|---|---|---|---|
| 4,091,161 | 5/1978 | Desverchere | 428/402 |
| 4,474,845 | 10/1984 | Hagerman et al. | 428/408 |
| 4,543,288 | 9/1985 | Radvan et al. | 428/903 |
| 4,624,820 | 11/1986 | Barraclough | 428/284 |
| 4,734,321 | 3/1988 | Radvan et al. | 428/402 |
| 4,751,134 | 6/1988 | Chenoweth et al. | 428/284 |

OTHER PUBLICATIONS

"The RRIM Revolution" Lawrence K. English; ME; Oct. 1986; pp. 39–43.
Arimax Adventure Literature and Specifications, Ashland Chemical Co., 1986.
RX Engineering Thermosets, Rogers Corp. Advertising Literature; Jul. 1986.

*Primary Examiner*—James J. Bell
*Attorney, Agent, or Firm*—John D. Lister; Cornelius P. Quinn; Fred A. Winans

[57] ABSTRACT

A high density moldable fiber glass material is disclosed. The glass fiber is coated with a powdered and liquid binder to form the material wherein the glass fiber is 45–90% and the binder is 10–45% by weight. The binder content is itself comprised of 25–50% of liquid binder and 50–75% of powdered binder.

6 Claims, No Drawings

MOLDABLE FIBER GLASS MATERIAL

BACKGROUND OF THE INVENTION

1. Field of the Invention

This application is a continuation-in-part application of U.S. Application Ser. No. 07/123,824 filed Nov. 23, 1987, abandoned. The invention relates to the field of moldable materials.

More particularly, the invention relates to non-metallic moldable materials. In still greater particularity, the invention relates to moldable fiber glass material.

2. Description of the Prior Art

Metals such as sheet metal and aluminum have long been used as structural materials. In automobile manufacture, weight and strength are key elements for a structural material. Sheet steel has long been used to produce automobile frame and body parts. While steel possesses good strength characteristics, its weight, 490 lbs. per cu/ft., and corrosion susceptibility render it less than ideal. While aluminum is lighter at 160 lbs. per cu/ft. its cost precludes its use in mass produced parts.

As one alternative to metal parts, plastic composites have been employed. For example, sheet molding compounds (SMC) have been utilized in some applications. Typically, SMC uses about ⅓ polyester, ⅓ chopped fiber glass reinforcement and ⅓ calcium carbonate filler. While SMC is relatively easy to mold it suffers from a lack of strength and the surface characteristics are poor and do not approach a Class A Type Automotive finish. A Class A Type Finish is one which needs no sanding or other finishing steps and is ready to paint.

As another alternative to steel parts and SMC, reaction injection molding (RIM) has become increasingly popular. RIM has traditionally been a polyurethane process. That is, reactive isocyanates and polyols are combined as liquid monomers by an impingement mixer and injected into a mold. The isocyanates and polyols react with one another (along with hardeners, chain extenders, cross linkers, fillers, catalysts, foaming agents, or other additives, usually mixed with the polyol) to form linear polymer chains or branched networks depending upon the nature of the monomer inside the mold. The reactants are generally injected as liquids and require relatively low molding pressures. In addition, the reaction is exothermic and triggered by shear heating or mixing and thus additional heat does not need to be added to the system in order to fabricate the parts.

Recently, reinforced reaction injection molding (RRIM) has found favor. RRIM uses chopped fiber, glass flakes, mica, and other reinforcements and fillers used to boost the physical properties of RIM systems. However, the strength and stiffness of RRIM parts are lower than those of fabricated composites utilizing continuous fibers. Also, RRIM has generally required more than 2½ minutes cycle time per part raising potential productivity problems for high volume applications.

Attempts to increase the strength and stiffness of RRIM parts have been made utilizing components with preplaced mat reinforcements to provide long fiber composite properties. That is, generally glass fiber mats are used to boost the strength properties of the material. This Structural Reaction Injection Molding (SRIM) achieves improved structural strengths. However, this process utilizes pre-forms of fiber glass mat which entail an extra manufacturing step. The pre-forms must be set up in the mold prior to the injection molding. While suited for its intended purpose, such systems tend to become complicated and increase the cycle times needed to produce individual parts. SRIM requires even longer cycle times than RRIM due to set up of mat pre-forms. Thus, while reduced weight and corrosion resistance favor the use of plastic reinforced materials, production problems, strength and in some cases, surface finish, serve to limit their use.

SUMMARY OF THE INVENTION

The invention is a high density material comprising from about 45 to about 90% by weight glass fibers which are substantially coated with from about 10 to about 55% by weight binder. The binder includes a powdered binder and a liquid binder. The glass fibers are coated with the binder during the production process and the resultant material is collected and packaged in its uncured form. This material may then be compressed to a density of at least 1.1 grams per cc and preferably 1.7–1.9 grams per cc during molding to produce a desired structure. Because fibers already coated with binder are supplied, the relatively cumbersome steps of the previously described RIM and RRIM processes are reduced such that only compression molding and curing need to be accomplished to produce the structural member. Preferably, each binder is a phenolic resin such as phenol formaldehyde. The glass fibers may be from about 3 up to about 10 micron diameter fibers but are preferably 4 to 5 micron diameter fibers. Additional reinforcing fiber such as chopped glass reinforcing fiber may be added in amounts of from about 5 to 15% by weight.

DESCRIPTION OF THE PREFERRED EMBODIMENT

Because of problems associated with the prior RIM and RRIM methods, wherein a two part binder and a reinforcement are separately injected into the mold, a material in which the fast curing binder was added directly to the glass fiber during manufacture was developed wherein the uncured material could be subsequently stored and handled with retention of the binder therein while exhibiting minimum tackiness. In addition, while the RIM and RRIM procedures used glass fibers as a reinforcement, that is, generally in amounts below 40% by weight, the present invention utilizes glass fibers in amounts from about 45% to about 90% by weight. By varying the weight percents of glass fibers and binder, various combinations of structural characteristics can be obtained. In addition, the use of additional reinforcing fibers such as glass mat or chopped glass or various interleaf materials can alter the structural strength properties of the resultant material. For example, 5–15% chopped glass strand has been found to increase impact strength by a factor of up to 10 times. Referring to Table I, a comparison of various dry and liquid phenolic resin percentages by dry weight to fiber glass weight percentages along with reinforcing fiber weight percentages and types are compared with respect to their properties. A moldable composition according to the present invention incorporating good handling characteristics of the uncured blanket and excellent physical properties of the cured material was produced with the following composition:

28% BTL Varcum 29-217 powdered phenolic resin
12% by dry weight of liquid phenolic binder (Table II)
48% 5 micron rotary attenuated glass fiber 12% Manville Star Rov SMC-17 13 micron glass fiber reinforcement A 10"×10" plaque was molded for two minutes at 300° F. and yielded a cured material 0.14 inches thick with a density of 1.70 g/cc. The physical properties are described in Table I as Sample 4.

4,058,386, incorporated herein by reference, for a description of one rotary method for making glass fibers.

The resin or binder coated fibers are collected on a conventional collection chain apparatus. However, in order to increase handleability of the coated fiber blanket, an interleaf is used. That is, on the chain, an inter-

TABLE I
STRENGTH PROPERTIES OF VARIOUS PLAQUES

| Sample No. | Percent Phenolic Resin Dry | Percent Phenolic Resin Liquid | Percent F/G Fibers | Fiber Glass Fiber Diameter (Microns) | Percent Reinforcing Fiber | Reinforcing Fiber Type | Molded Plaque Density (g/cc) | Three Point Flexural Test Per ASTM D790 Modulus of Rupture ($\times 10^3$ psi) | Three Point Flexural Test Per ASTM D790 Modulus of Elasticity ($\times 10^6$ psi) | Notched Izod Impact Strength of ASTM D256A (ft-lb/in) |
|---|---|---|---|---|---|---|---|---|---|---|
| 1. | 43 | 7 | 50 | 4 | 0 | — | 1.67 | — | — | 1.0 |
| 2. | 43 | 6 | 49 | 4 | 2 | Glass Mat on Surfaces | 1.70 | 22.2 | 1.8 | 1.1 |
| 3. | 19 | 11 | 70 | 4 | 0 | — | — | 22.2 | 2.44 | — |
| 4. | 28 | 12 | 48 | 5 | 12 | Random Chopped Fiber Glass Strand | 1.70 | 23.3 | 2.13 | 9.7 |
| 5. | 29 | 12 | 53 | 5 | 6 | Random Chopped Fiber Glass Strand | 1.74 | 19.0 | 2.37 | 3.9 |

Test Method:
ASTM D790, Method I (three point) with 3 inch span.
Crosshead speed at 0.3 in/minute.
Samples approximately 0.9" wide × 0.14" thick × 5.0" long.

Initial attempts to produce an acceptable uncured material utilized only liquid phenolic resin as the binder. However, this produced a very wet and sticky type product which was difficult to handle and to cure. Thus, it was determined that powdered resin should be used in conjunction with the liquid resin to produce the product. It was found that at least 1 part by weight powdered binder to one part by dry weight liquid binder should be used to reduce stickiness of the product as well as the moisture content. The combination of liquid and dry binder should include 50-75% by weight dry (powdered) binder and 25-50% by dry weight of liquid binder. When using at least half powdered binder the uncured glass wool was much easier to handle, was more easily packaged, and was easier to cure. In addition, the dry binder increased the shelf life of the product. Shelf life of one month or more at room temperature has been achieved. As a comparison, SMC must be refrigerated during storage.

The product may be made on either a conventional hot gas blast attenuated fiber glass manufacturing process, commonly referred to as a pot and marble process, or a rotary process. Preferably, however, the fiber glass is made on a rotary process. It was found that by producing the fiber glass on a rotary process more uniformity of fiber diameter could be obtained. Using the pot and marble process, primary glass strands (larger diameter strands) appeared in the product and affected uniformity of the compressed material. In addition, these primary glass strands affected the surface finish of the material. The use of glass fibers produced by the rotary method provided for more density uniformity and a surface which approached a Class A type surface.

When, as is preferable, the present invention is produced on a rotary process, the binder is applied to the fibers as they are produced from the spinner. That is, the binders, both liquid and powdered, are applied to the fibers prior to their collection on a conventional screen with the liquid binder being applied prior to or generally concomitantly with application of the powdered binder. Reference is made to U.S. Pat. No.

leaf material such as a spun bonded polyester mat sold by the E. I. DuPont De Nemours & Co., Inc. under the trademark REMAY may be used. Alternatively, nylon or glass interleafs could be used. The fiber is collected onto the interleaf and trimmed to the desired width. The interleaf-fiber glass blanket layer is then cut to desired lengths and these lengths may be placed one on top of another to build layered material at any desired weight per square foot. While multiple layers have been employed due to manufacturing convenience, it should be expressly understood that one layer of fiber on one interleaf may be employed. While the interleaf may be removed prior to compressing and curing the material, it is desirable that the interleaf remain in the material for ease of molding and for added strength.

It is to be understood that the powdered binder is held in place by the tacky nature of the liquid binder covering the surface of the glass fibers. The amount of dry binder should ideally be sufficient to completely cover the liquid binder to eliminate surface tackiness of the pre-molded product, without adding excess dry binder that is not adhered to the glass fibers by the liquid binder. If excess dry binder is added that is not adhered, such dry binder will form dust during subsequent handling of the moldable blanket. The ratio of liquid binder to dry binder is important if the finished moldable product is to display a balance of tack-free and dust-free performance.

Such balance between liquid and dry binder is influenced by the surface area to which the binder is applied. In this moldable product, the available surface area to which the binders are applied is generally a cylindrical form (i.e. cylindrical fibers) and therefore the surface area changes in accordance with the diameter of the fibers forming the blanket. Thus, as available surface area changes the ratio of binder to fiber glass content will also change. And, dependent upon the thickness of the liquid binder (which depends, somewhat on its viscosity) applied to the fibers, the ratio of liquid binder to dry binder will also vary.

The surface area for a given mass of fiber glass can be expressed by the well known formula:

$$SA = K/d$$

where
- SA is the surface area;
- K is a constant; and
- d is the diameter of the fibers forming the blanket.

Therefore as the fiber diameter is decreased, the surface area for the same weight of fiber glass material increases. With an increased surface area, the liquid binder is spread out more providing additional sites for dry binder to attach. In such instance, the balance of dry to liquid binder is shifted and additional dry binder is required to provide a tack-free finished product.

Additional strength property variations may be achieved by utilizing various reinforcing fibers. That is, for example, chopped fiber glass strands or other fibers such as polyester, carbon, nylon, or KEVLAR Aramid (trademark of DuPont) fibers may be added to the binder coated fiber glass strands prior to collection on the interleaf. Alternatively, a glass mat could be used in place of, or in addition to, the interleaf to alter the strength properties. If reinforcing fiber is used, it is preferably added in amounts of from about 5 to about 15% by weight of the material. Either random or layered chopped fiber glass strand may be added during the collection process prior to the fibers being collected on the interleaf.

To produce a ⅛" plaque, 5 layers were compressed to a density of about 1.7 grams per cc. The molding pressures are generally in the 500 to 1,000 psi range. The curing of the compressed material may occur at temperatures between 275° to 350° for from less than 2 through about 60 minutes. The use of the powdered resin or phenolic, because of its high molecular weight, aids in the curing cycle and reduces the vapor emissions during the curing. In addition, as stated above, ease of handling and longer shelf life are achieved with the powdered binder; however, the liquid binder provides adhesive qualities for retaining the powdered binder in the material to eliminate binder dust or loss of powdered binder during subsequent handling and storage.

The advantages of the invention over the RIM, RRIM or SRIM processes include ease of molding, uniformity of distribution, surface finish, and strength. That is, more control over the end product can be achieved by varying the materials which are uniformly distributed in the fiber glass blanket during manufacture. Injection molding these materials does not always result in such uniform distribution. In addition, faster cycle times may be achieved with the present invention. That is, because injection molding is a multi-step process which adds reinforcing glass fibers as well as various chemicals, longer cycle times are required. It has been determined that less than 2 minutes may be required to mold the material of the present invention. RIM or RRIM generally requires at least 2½ minutes cycle time to mold the material and SRIM requires even longer cycle times due to setting up the glass mat preform.

In addition to the advantages already stated, the present invention also allows flexibility such that the inventive material may be engineered for specific purposes. As an example, four layers of fiber glass with 35% by weight phenolic resin and about 12% by weight reinforcing fiber could be compressed with one layer comprising 60% fiber glass wool and 40% binder. The layers with 12% reinforcing fiber and 35% binder provide increased structural integrity while the 60% fiber glass wool—40% binder layer provides a cured surface which approximates a Class A Type Automotive surface.

The binder formulation used to produce the material of the present invention includes resol type phenol formaldehyde resin in powdered or liquid form. The preferred liquid formulation also includes ammonium sulphate, a silane, water, and ammonia as shown below:

TABLE II

| Ingredient | Quantity |
| --- | --- |
| Resin (45% solids, 55% water) | 208 gallons |
| Ammonium Sulphate (100% Solids) | 22 lbs. |
| Silane (100% Solids) | 3.5 lbs. |
| Ammonia 28% Concentration (72% water) | 30 gallons |
| Water | 20 gallons |

The Ammonium Sulphate, Silane, Ammonia, and water were combined to produce a solution which was metered with the resin at 80% by volume resin solution to 20% by volume Ammonium Sulphate-Silane-Ammonia solution. The resin is a phenol formaldehyde condensate with a preferred mole ratio of 3.15 formaldehyde to 1 phenol. The free phenol concentration is 1% by weight and the free formaldehyde is 7.5% by weight. The catalyst is sodium hydroxide in an amount of 0.08 mole per mole of phenol.

The dry powdered binder is preferably a powdered high molecular weight phenol formaldehyde resin such as VARCUM 29-217 sold by BTL Specialty Resins Co. of Warren, N.J.

While the invention has been disclosed with respect to preferred embodiment thereof, it should be understood that changes and modifications may be made which are within the full intended scope of the invention as defined by the appended claims. For example, as stated above, various reinforcing fiber compositions may be used. In addition, various interleafs and/or glass mats may be used to adjust the strength properties of the inventive material. While phenol formaldehyde is a preferred binder, other thermosetting or thermoplastic binders such as epoxy resin or polyester resin or polypropylene resin could be used.

What is claimed is:

1. An uncured, readily moldable blanket comprising: non-woven glass fibers and a binder component;
said binder component comprising a liquid binder material having a tacky characterisitic and a powdered binder material; and wherein,
said liquid binder material forms a first coating about the surface of said fibers;
said powdered binder material forms a second coating over said liquid binder material to effectively eliminate surface tackiness of said liquid binder material; and,
said fibers and binder component are present in said blanket in the dry weight percentage range of between 45 to 90% of glass fibers and 10–55% of binder.

2. An uncured moldable blanket of claim 1 wherein essentially all of said powdered binder material is adhesively retained by said liquid binder material to effectively eliminate dry binder loss from said blanket during subsequent handling.

3. An uncured, moldable blanket of claim 1 wherein said binder component is composed of between 25-50% liquid binder material by dry weight and 50-75% powdered binder material by dry weight.

4. An uncured moldable blanket according to claim 3 wherein said glass fiber comprise between 80-100% bulk fiber glass by dry weight of fibers of up to about 10 microns in diameter, and 0-20% chopped reinforcing fiber glass by dry weight of fibers of greater than 5 microns in diameter.

5. An uncured moldable blanket according to claim 4 wherein said glass fiber comprise approximately 60% of the dry weight of said blanket and said binder component is approximately 40% of the dry weight of said blanket.

6. An uncured, moldable blanket according to claim 4 wherein said blanket comprises at least two plys of binder coated fiber glass, of between 45 to 90% fibers and 10-55% binder with the ratio of glass fibers to binder being in the weight percentage range and with at least one ply thereof having a higher ratio, of glass fibers to binder than the other of said plys whereby in a compressed cured condition of said blanket, said one ply will provide greater stiffness than said other of said plys and said other of said plys will provide a smoother surface finish, than said one ply.

* * * * *